(12) United States Patent
Morales et al.

(10) Patent No.: US 9,019,549 B2
(45) Date of Patent: Apr. 28, 2015

(54) EXCEPTION PAGE PROGRAMMING FOR BANNER SHEETS

(75) Inventors: Javier A. Morales, Rochester, NY (US); Jonathan David Levine, Rochester, NY (US); Michael J Evan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1308 days.

(21) Appl. No.: 12/323,705

(22) Filed: Nov. 26, 2008

(65) Prior Publication Data

US 2010/0128302 A1    May 27, 2010

(51) Int. Cl.
*G06K 15/00* (2006.01)
*G06F 3/12* (2006.01)

(52) U.S. Cl.
CPC ............ *G06F 3/1204* (2013.01); *G06F 3/1205* (2013.01); *G06F 3/1248* (2013.01); *G06F 3/1253* (2013.01); *G06F 3/126* (2013.01); *G06F 3/1275* (2013.01); *G06F 3/1285* (2013.01)

(58) Field of Classification Search
USPC ......................................................... 358/401
See application file for complete search history.

(56) References Cited

U.S. PATENT DOCUMENTS

| | | | |
|---|---|---|---|
| 5,146,344 A * | 9/1992 | Bennett et al. | 358/296 |
| 5,547,178 A * | 8/1996 | Costello | 270/52.02 |
| 6,075,617 A * | 6/2000 | Fischer et al. | 358/1.16 |
| 6,373,588 B1 * | 4/2002 | Fischer et al. | 358/1.16 |
| 6,687,704 B1 * | 2/2004 | Russell | 707/999.1 |
| 6,831,753 B1 * | 12/2004 | Tsuchitoi | 358/1.15 |
| 2003/0154395 A1 * | 8/2003 | Miura et al. | 713/200 |
| 2003/0220888 A1 * | 11/2003 | Smith et al. | 705/407 |
| 2004/0114184 A1 * | 6/2004 | Sugiyama | 358/1.18 |
| 2004/0143588 A1 * | 7/2004 | Russell | 707/100 |
| 2004/0257606 A1 * | 12/2004 | Bergstrand et al. | 358/1.15 |
| 2005/0030572 A1 * | 2/2005 | Tsuchitoi | 358/1.13 |
| 2005/0128527 A1 * | 6/2005 | Brawn et al. | 358/401 |
| 2005/0185225 A1 * | 8/2005 | Brawn et al. | 358/401 |
| 2006/0028689 A1 * | 2/2006 | Perry et al. | 358/3.28 |
| 2007/0139692 A1 * | 6/2007 | Martin et al. | 358/1.15 |
| 2007/0229878 A1 * | 10/2007 | Pandit et al. | 358/1.15 |

* cited by examiner

*Primary Examiner* — Nicholas Pachol
(74) *Attorney, Agent, or Firm* — Richard H. Krukar; Kermit D. Lopez; Luis M. Ortiz

(57) ABSTRACT

Job tickets with banner descriptions and document descriptions are automatically generated by a print shop's DMS. The banner descriptions and the document descriptions are composed of PDL instructions. Document descriptions can be managed and altered without necessarily affecting the job ticket. The banner page PDL instructions are specially designated so that banner pages cannot be managed without also managing the job ticket. Preserving the banner page within a job ticket prevents unwanted side effects from disturbing the print shop's work flow.

18 Claims, 5 Drawing Sheets

EXCEPTION PAGE PROGRAMMING FOR BANNER SHEETS

TECHNICAL FIELD

Embodiments are related to printing processes. Embodiments are also related to the workflows in print shops for printing documents and in particular to the automatic production and handling of banner pages.

BACKGROUND

Many print shops use a work flow depending on banners or banner pages. Banners are sheets of paper that are often positioned on top of a printed stack of pages. The banners have instructions regarding what to do with the stack. Operators read the banner and then move or process the stack as instructed. Some print shops use banners that are handwritten on scrap paper, some others use computer printouts. There are many variations of the banner concept.

More advanced print shops use automatically generated banners. A document request submitted to the shop's document management system (DMS) results in a job ticket that contains or references a document description. A printing engine can use the document description to produce physical copies of the desired document. Custom programming causes the DMS to automatically generate a banner description that can be individually printed or that is prepended to the document description. Individually printed banners are hand placed onto a stack. Prepended banner descriptions result in the banner being printed as the first page of the stack.

FIG. 5, labeled as prior art, illustrates a document description 501 containing page description language (PDL) instructions for multiple pages. PostScript is a commonly used PDL that many printers can interpret. The printer accepts the document description 501 and then interprets the instructions for each page to generate the stack. The first page is printed by interpreting the page 1 PDL instructions 502. The second page is printed by interpreting the page 2 PDL instructions 503. The third page is printed by interpreting the page 3 PDL instructions 504. The fourth page is printed by interpreting the page 4 PDL instructions 505.

The document description 501 can also contain PDL instructions that affect every page. For example, the document description 501 can specify that every page is to be printed on certain size media having a particular finish.

The PDL used to describe documents is a rich language with many features. The features ease the handling, specification, and description of documents. Systems and methods for bringing the richness PDL features to banner descriptions without also damaging print shop work flows are needed.

BRIEF SUMMARY

Aspects of the embodiments address limitations and flaws in the prior art by producing job tickets that incorporate or reference banner page descriptions expressed in a page description language. The banner page descriptions can be defined by or otherwise customized by a user.

It is therefore an aspect of the embodiments that a job ticket includes many instructions written in a page description language (PDL). Some of the PDL instructions form document descriptions while others form banner descriptions. A rendering engine, such as a printer, can accept the job ticket and use the document descriptions to print documents and the banner descriptions to print banners, also known as banner pages.

It is also an aspect of the embodiments that the banners include human readable instructions for document handling. For example, the banner can be a fully filled out shipping label or a textual instruction to submit the document to a bindery that cuts the pages and glues on a cover. Handling instructions can be in text, pictogram, hieroglyph, or a combination. The key is that the operator handling the document can properly interpret the handling instructions.

It is a further aspect of the embodiments that banner page designators indicate which of the PDL instructions comprise the banner descriptions. As such, banner descriptions and document descriptions can be intermingled.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention

DETAILED DESCRIPTION OF THE INVENTION

The particular values and configurations discussed in these non-limiting examples can be varied and are cited merely to illustrate embodiments and are not intended to limit the scope of the invention.

Job tickets with banner descriptions and document descriptions are automatically generated by a print shop's document management system (DMS). The banner descriptions and the document descriptions are composed of PDL instructions. Document descriptions can be managed and altered without necessarily affecting the job ticket. The banner page PDL instructions are specially designated so that banner pages cannot be managed without also managing the job ticket. Preserving the banner page within a job ticket prevents unwanted side effects from disturbing the print shop's work flow.

Figure 1:
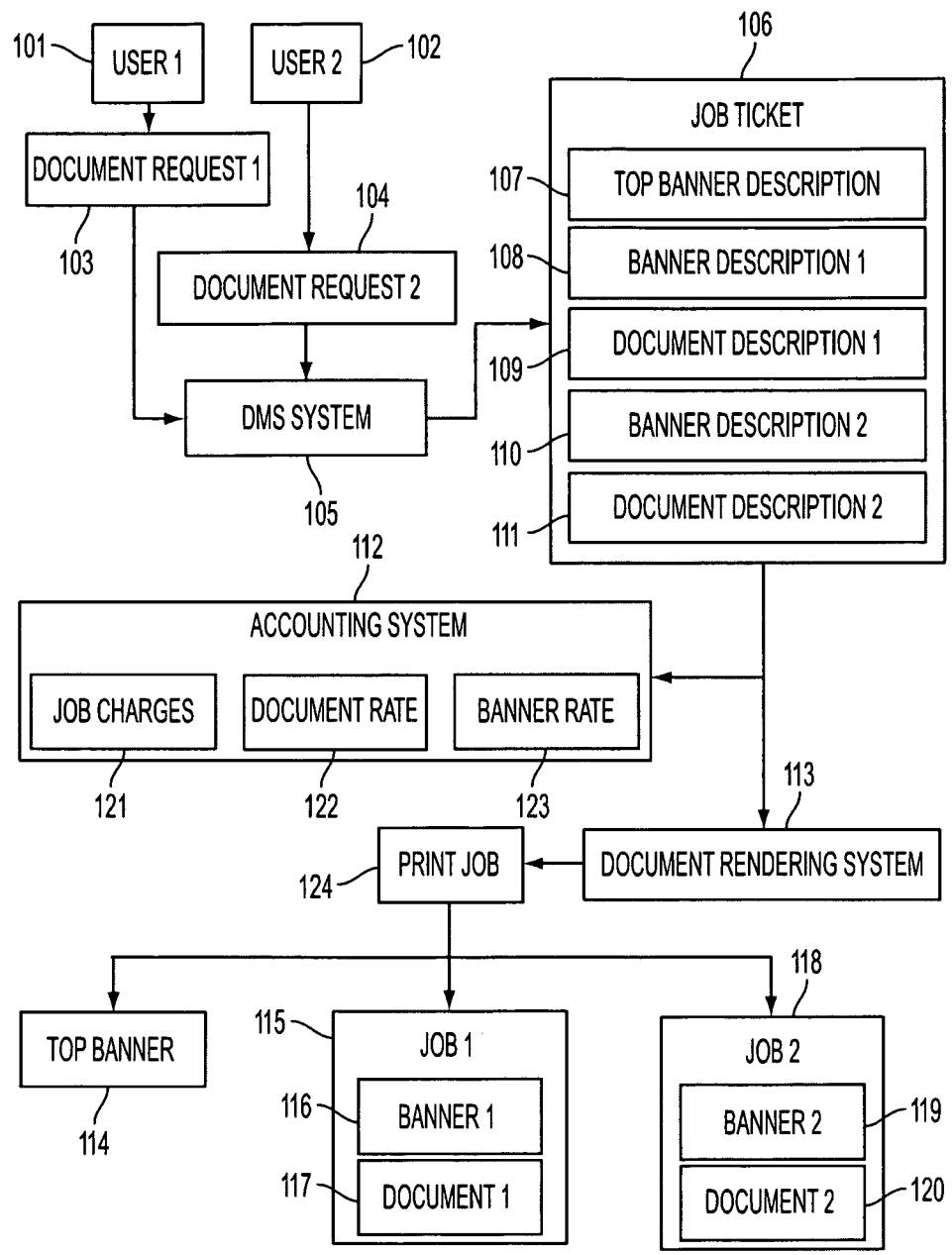
FIG. 1 illustrates a system that assembles a job ticket that results in the printing of a number of banners and documents in accordance with aspects of the embodiments.

FIG. 1 illustrates a system that assembles a job ticket that results in the printing of a number of banners and documents in accordance with aspects of the embodiments. A first user 101 submits document request 1 103 to a DMS 105. A second user 102 submits document request 2 104 to the DMS 105. The DMS 105 generates a job ticket 106. The example illustrated in FIG. 1 indicates that DMS 105 has combined the document requests into a single job ticket 106. The other figures illustrate other examples of banner sheet programming and job ticket formation.

The job ticket 106 contains a top banner description 107, banner description 1 108, document description 1 109, banner description 2 110, and document description 2 111. A document rendering system (DRS) 113 interprets the job ticket and produces a physical version of the print job 124. The print job 124 is a stack of pages containing a top banner 114, job 1 115 and job 2 118. Job 1 115 is produced in response to document request 1 103 and contains banner 1 116 and document 1 117. Job 2 118 is produced in response to document request 2 104 and contains banner 2 119 and document 2 120. The documents are the items that the users requested whereas the banners are pages of instructions regarding document handling. Print shop operators interpret the banner instructions and process the documents accordingly. The top banner sheet 114 contains instructions for the handling of the print job 124. For example, the top banner 114 can contain instructions to split the page stack into separate stacks, one each for the top banner 114, job 1 115 and job 2 118.

Accounting system 112 accumulates and tracks the jobs charges 121 that accrue while fulfilling a document request. The charges can be assessed on a per page basis, flat fee, or some other basis. The document rate 122 is the charge assessed for document pages. The banner rate 123 is the charge associated with banner pages. The rates can be different because the banners can be treated as a special service having additional value or as an incidental service that is part of overhead. Regardless, it is important that the banner pages be properly designated so that the accounting system 112 can assess the proper charge.

Figure 2:
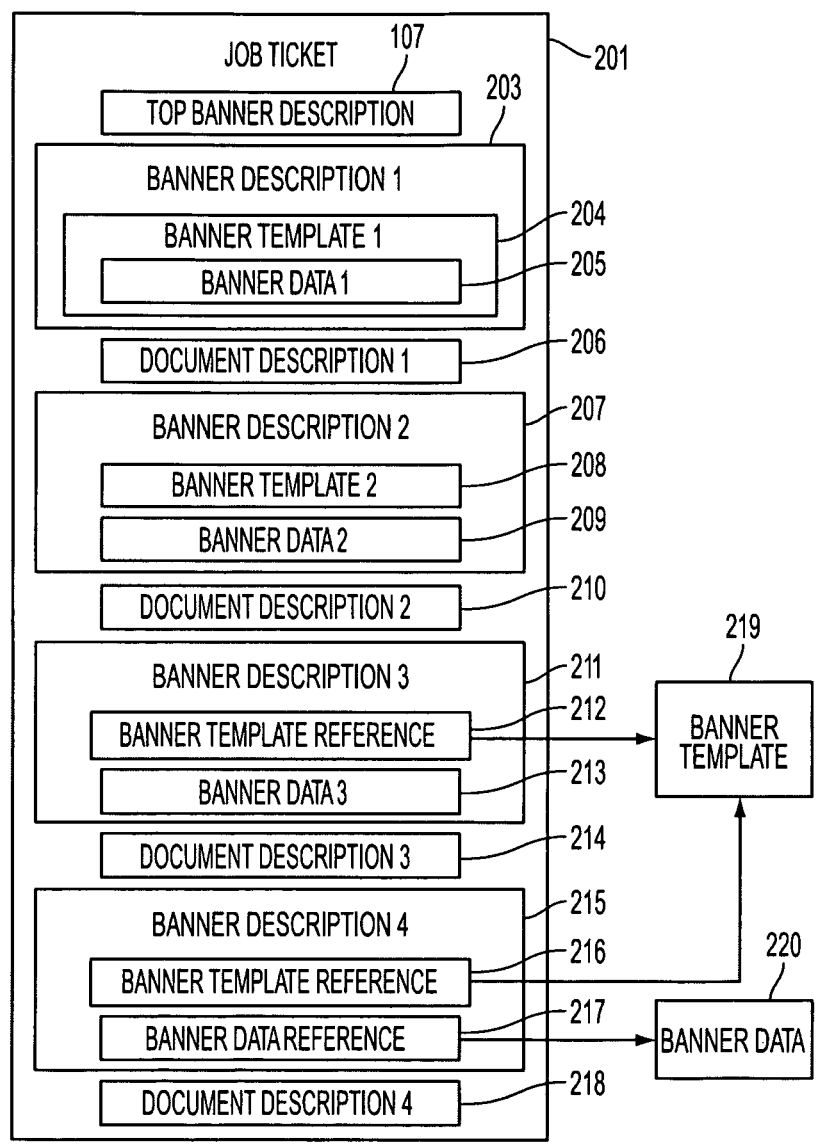
FIG. 2 illustrates various banner descriptions using banner templates within a job ticket in accordance with aspects of the embodiments.

FIG. 2 illustrates various banner descriptions using banner templates within a job ticket 201 in accordance with aspects of the embodiments. Banner description 1 203 is associated with document description 1 206 because banner 1 will contain handling instructions for document 1. Banner description 1 203 contains a template, banner template 1 204, that has been filled out to thereby contain banner data 1 205. A template is a preexisting form, either electronic or physical, containing fields that can be filled out with data.

Banner description 2 207 is associated with document description 2 210 because banner 2 will contain handling instructions for document 2. Banner description 2 207 contains banner template 2 208 and banner data 2 209. The template can be automatically filled with the data at a later time, perhaps by the DRS itself.

Banner description 3 211 is associated with document description 3 214 because banner 3 will contain handling instructions for document 3. Banner description 3 211 contains a banner template reference 212 and banner data 3 213. The banner template reference 212 specifies the location of a banner template 219. The banner template 219 can be automatically fetched and filled with the data at a later time, perhaps by the DRS itself.

Banner description 4 215 is associated with document description 4 218 because banner 4 will contain handling instructions for document 4. Banner description 4 215 contains a banner template reference 216 and a banner data reference 217. The banner template reference 212 specifies the location of a banner template 219. The banner data reference 217 specifies the location of a banner data 220. The banner template 219 and the banner data 220 can be automatically fetched and filled with the data at a later time, perhaps by the DRS itself.

Figure 3:
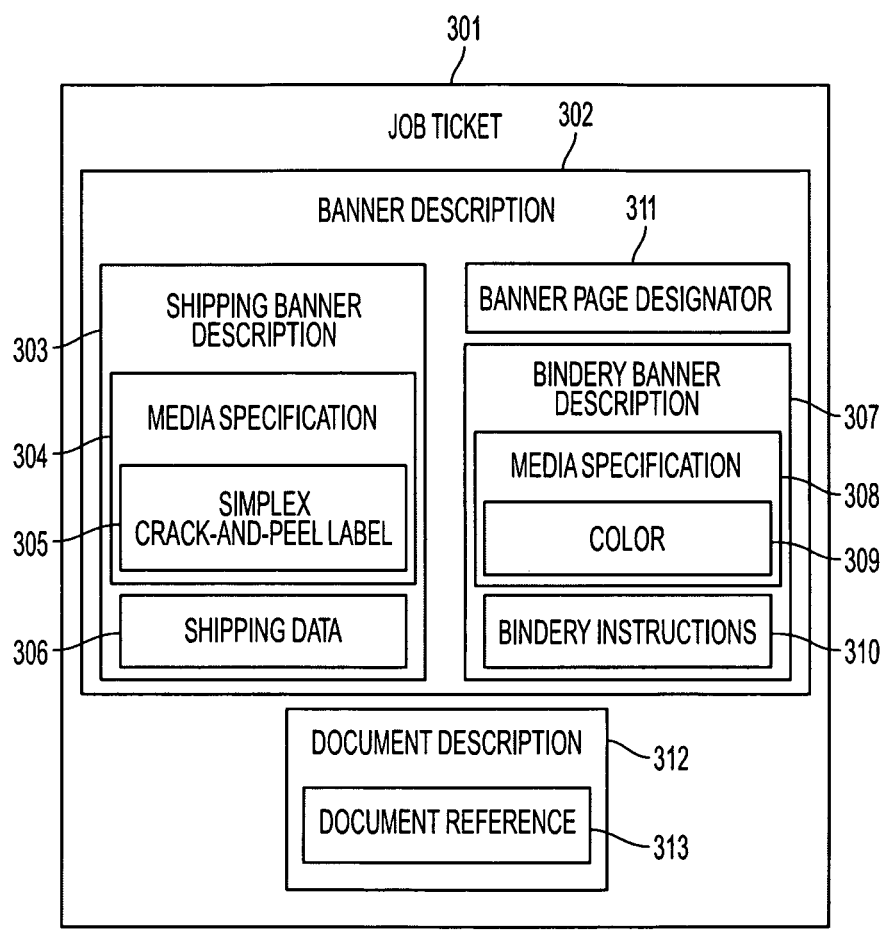
FIG. 3 illustrates banner descriptions for different types of banners in accordance with aspects of the embodiments.

FIG. 3 illustrates banner descriptions for different types of banners in accordance with aspects of the embodiments. Job ticket 301 contains banner description 302 and document description 312. Banner description 302 contains a banner page designator 311, a shipping banner description 303, and a bindery banner description 307. The banner page designator 311 can inform the DMS and the DRS which pages or PDL instructions are for banners. The bindery banner description 307 contains bindery instructions 310 and a media specification 308 including a color selection 309. For example, the bindery banner description 307 can be purple and instruct that the document be spiral bound then passed to the shipping department. The shipping banner description 303 contains shipping data 306 and a media specification 304 for a simplex crack-and-peel label 305. The crack-and-peel label can be automatically printed with the shipping data such that the shipping department simply packages the document and affixes the label to the package.

The document description 312 contains a document reference 313. A document reference can contain data indicating the location of another document description. For example, document reference 313 can be a PDL instruction or PDL data indicating the location of document description 501, described above. A document rendering system can follow document references to obtain the PDL data required for the rendering of each page in a document. A document reference 313 can be specified in a number of ways such as an internet URL, a reference to a file location in the DMS 105 or elsewhere, a database reference, or a reference to a subset of pages with the document description 312 itself.

The illustrated job ticket 301 shows the banner description 302 and document description 312 as separate. In practice, the document description 312 can also contain the banner description 302 or one of the specific banner descriptions such as the bindery banner description 307.

Figure 4:
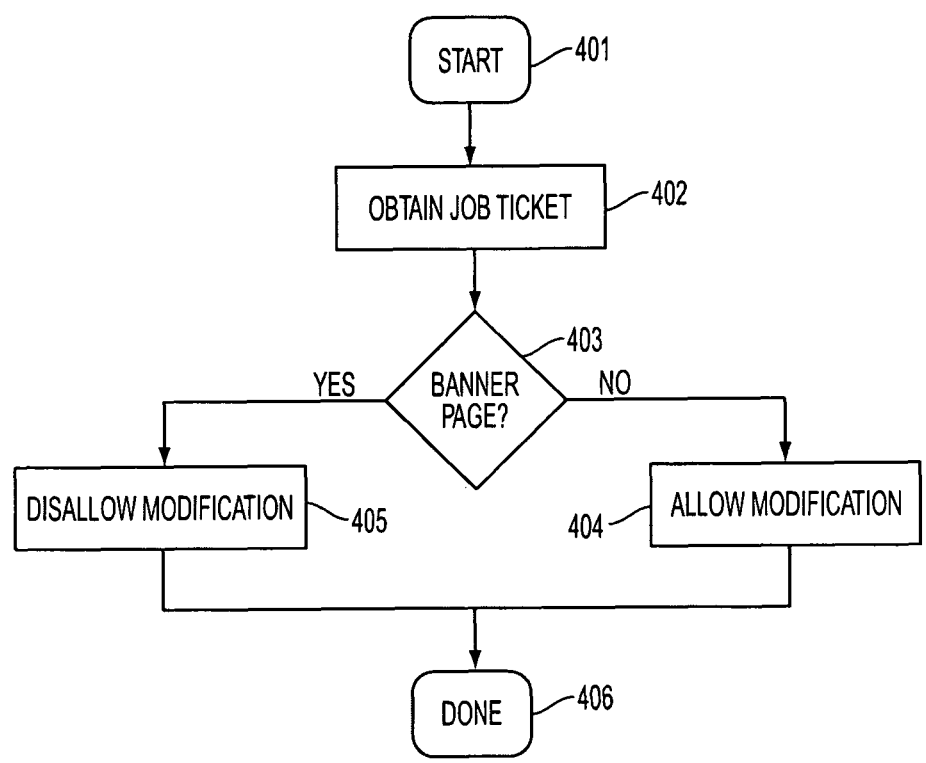
FIG. 4 illustrates a high level flow diagram of preventing banner descriptions that are already incorporated into job tickets from being managed in accordance with aspects of the embodiments.
Figure 5:
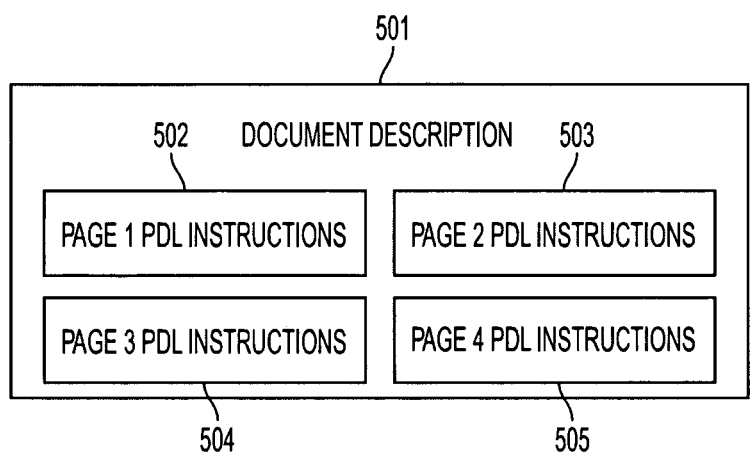
FIG. 5, labeled as prior art, illustrates a description containing the PDL instructions for multiple pages.

FIG. 4 illustrates a high level flow diagram of preventing banner descriptions that are already incorporated into job tickets from being managed in accordance with aspects of the embodiments. After the start 401, a job ticket is obtained 402. A person, wishing to alter some aspect of the job, attempts to edit the job ticket. If the edited page is a banner page 403, then modification is disallowed 405. Otherwise, it can be allowed 404. Eventually, the process is done 406. Banner pages, being intimately related to the print shops process flow, should never be altered inside a job ticket. Instead, a new job ticket having the desired banners should be generated.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:
a document management system that accepts a plurality of document requests from a plurality of users requesting a plurality of documents;
a single job ticket produced by the document management system based on the document requests wherein the job ticket comprises a plurality of descriptions comprising a top banner description, a plurality of banner descriptions and a plurality of document descriptions and wherein the descriptions comprise a plurality of page description language instructions;
wherein the job ticket comprises at least one banner page designator that explicitly designates which of the page description language instructions comprise one of the banner descriptions;
a document rendering system that accepts the job ticket and produces a single print job comprising a top banner, a plurality of banners, and the documents wherein the top banner comprises human readable handling instructions for the entire print job and the banners comprise additional human readable handling instructions for the documents to thereby provide each of the users with at least one of the documents; and
wherein the document management system allows the job ticket to be modified excepting that the document management system prevents the banner descriptions within the job ticket from being modified.

2. The system of claim 1 further comprising an accounting system that assembles job charges.

3. The system of claim 2 wherein the documents are charged at a document rate and wherein the banners are charged at a banner rate.

4. The system of claim 1 wherein the document descriptions further comprise the banner description.

5. The system of claim 1 wherein at least one of the banner descriptions comprises banner data and a banner template and wherein the system enters the banner data into banner template.

6. The system of claim 1 wherein at least one of the banner descriptions comprises banner data and a banner template reference specifying the location of a banner template wherein the system follows the banner template reference to thereby obtain the banner template.

7. The system of claim 1 wherein at least one of the banner descriptions comprises a banner data reference and a banner template reference wherein the banner template reference specifies the location of a banner template, wherein banner data reference specifies the location of banner data, wherein the system follows the banner template reference to thereby obtain the banner template, and wherein the system follows the banner data reference to thereby obtain the banner data.

8. The system of claim 1 wherein at least one of the banner descriptions comprises a shipping banner description comprising shipping data and wherein producing the banner comprises producing a shipping label based on the shipping banner description.

9. The system of claim 1 wherein at least one of the banner descriptions comprises a bindery banner description and wherein producing the banner comprises printing bindery instructions.

10. The system of claim 1 further comprising:
an accounting system that assembles job charges wherein documents are charged at a document rate and wherein banners are charged at a banner rate,
wherein the banner descriptions comprise a bindery banner description and a shipping banner description comprising shipping data,
wherein producing the banners comprises printing bindery instructions and producing a shipping label based on the shipping banner description and
wherein at least one of the banner descriptions comprises banner data and a banner template reference specifying the location of a banner template.

11. The system of claim 1 wherein the human readable handling instructions instruct an operator to split the print job in a specified way.

12. A system comprising:
a document management system that accepts a plurality of document requests from a plurality of users requesting a plurality of documents and produces a single job ticket comprising a plurality of page description language instructions that describe a top banner, a plurality of banners, and the documents wherein each of the users requests at least one of the documents;
wherein the top banner comprises a handling instruction for both the banners and documents;
wherein each one of the banners comprises a handling instruction for at least one of the documents;
wherein the job ticket comprises at least one banner page designator that explicitly designates which of the page description language instructions specify the banners;
a document rendering system that accepts the job ticket and produces a single print job comprising the top banner, the banners and the documents; and
wherein the document management system allows the job ticket to be modified excepting that the document management system prevents the banner descriptions within the job ticket from being modified.

13. The system of claim 12 further comprising an accounting system that assembles job charges wherein documents are charged at a document rate and wherein banners are charged at a banner rate.

14. The system of claim 12 further comprising an accounting system that assembles job charges wherein documents are charged at a document rate and wherein banners are charged at a banner rate.

15. The system of claim 14 wherein a banner description describes at least one of the banners and wherein the banner description comprises a banner template comprising banner data.

16. The system of claim 14 wherein a banner description describes at least one of the banners and wherein the banner description comprises banner data and a banner template reference specifying the location of a banner template.

17. A method comprising:
providing a document management system the accepts a plurality of document requests from a plurality of users and produces a single job ticket comprising page description language data that describes a plurality of pages, the production of the job ticket comprising explicitly designating a subset of the pages as comprising a plurality of banners wherein the remaining pages are document pages comprising a plurality of documents; and wherein the designation permits the intermixing of the page description language data describing the banners with the page description language data describing the documents;
printing documents and banner pages as directed by the job ticket to thereby satisfy each one of the document requests; and wherein the document management system allows the job ticket to be modified excepting that the document management system prevents the banner descriptions within the job ticket from being modified.

18. The method of claim 17 wherein the job ticket comprises a banner page description that comprises a banner page designator that designates at least one of the pages as comprising a banner.

* * * * *